US011623729B2

(12) United States Patent
Noebel et al.

(10) Patent No.: US 11,623,729 B2
(45) Date of Patent: Apr. 11, 2023

(54) METHOD FOR PRODUCING A CROSSMEMBER FOR A VEHICLE AND A CROSSMEMBER FOR A VEHICLE

(71) Applicant: Airbus Operations GmbH, Hamburg (DE)

(72) Inventors: Torsten Noebel, Hamburg (DE); Wolfgang Eilken, Hamburg (DE); Wolfgang Schulze, Hamburg (DE); Memis Tiryaki, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 680 days.

(21) Appl. No.: 16/424,315

(22) Filed: May 28, 2019

(65) Prior Publication Data

US 2020/0001968 A1   Jan. 2, 2020

(30) Foreign Application Priority Data

Jun. 29, 2018   (DE) .......................... 102018115740.1

(51) Int. Cl.
*B64C 1/18* (2006.01)
*B64F 5/10* (2017.01)

(52) U.S. Cl.
CPC . *B64C 1/18* (2013.01); *B64F 5/10* (2017.01)

(58) Field of Classification Search
CPC ......... B21B 37/26; B21C 37/02; B21D 5/083; B21D 5/08; B64C 1/18
See application file for complete search history.

(56) References Cited

U.S. PATENT DOCUMENTS

| 4,248,072 A | * | 2/1981 | Hasegawa | .............. | B21H 7/007 |
|||||| 700/150 |
| 4,558,577 A | * | 12/1985 | Trishevsky | ............ | B21D 5/083 |
|||||| 72/12.7 |

(Continued)

FOREIGN PATENT DOCUMENTS

| CN | 105235551 A | * | 1/2016 |
| DE | 102005060252 A1 | | 6/2007 |

(Continued)

OTHER PUBLICATIONS

CN-105235551-A Translation (Year: 2016).*

(Continued)

*Primary Examiner* — Michael W Hotchkiss
(74) *Attorney, Agent, or Firm* — Greer, Burns & Crain, Ltd.

(57) ABSTRACT

A method for producing a crossmember for a vehicle prepares a workpiece having different thicknesses and a preliminary contour from a metal sheet of uniform thickness by flat roll forming to achieve different local thicknesses. The method cuts out the workpiece, and bending roll forms the workpiece to form a crossmember with a cross section having at least two flanges opposite one another, and a web situated between said flanges. The distance between the flanges is not constant along a longitudinal extent of the crossmember, and a thickness profile at least of the web is determined by the flat roll forming. The local thicknesses and the preliminary contour are such that a geometrical shape of the crossmember corresponds to a predetermined geometrical shape with different thicknesses and heights of the web and differently shaped regions of the flanges along the longitudinal extent of the crossmember.

9 Claims, 3 Drawing Sheets

(56) References Cited

U.S. PATENT DOCUMENTS

| | | | | |
|---|---|---|---|---|
| 7,546,755 | B2* | 6/2009 | Arns | C21D 8/02 |
| | | | | 72/203 |
| 8,485,012 | B2* | 7/2013 | Hermann | B21D 5/08 |
| | | | | 72/177 |
| 8,998,137 | B2* | 4/2015 | Braeutigam | B64C 1/18 |
| | | | | 403/205 |
| 9,085,323 | B2* | 7/2015 | Busch | B62D 25/04 |
| 9,174,258 | B2* | 11/2015 | Freitag | B21D 5/083 |
| 10,160,495 | B2* | 12/2018 | Hasegawa | B62D 29/007 |
| 10,960,927 | B2* | 3/2021 | Clausen | B21C 23/142 |
| 11,040,386 | B2* | 6/2021 | Okada | B21D 7/12 |
| 2006/0006284 | A1* | 1/2006 | Vetillard | B64C 1/18 |
| | | | | 244/119 |
| 2009/0266135 | A1* | 10/2009 | Knaup | B21D 53/88 |
| | | | | 72/377 |
| 2011/0179842 | A1* | 7/2011 | Freitag | B21D 5/083 |
| | | | | 72/7.2 |
| 2014/0008938 | A1* | 1/2014 | Busch | B21D 22/208 |
| | | | | 296/193.06 |
| 2015/0027189 | A1* | 1/2015 | Lee | B21D 5/083 |
| | | | | 72/181 |
| 2015/0251234 | A1* | 9/2015 | Daimaru | B21B 1/28 |
| | | | | 72/181 |
| 2016/0236255 | A1* | 8/2016 | Kubo | B21D 5/083 |
| 2017/0209909 | A1* | 7/2017 | Kavik | B21D 22/02 |
| 2017/0348748 | A1* | 12/2017 | Rouet | B23K 26/0093 |
| 2018/0056358 | A1* | 3/2018 | Yamashita | B21D 5/083 |
| 2018/0169723 | A1* | 6/2018 | Ihara | B21H 1/22 |
| 2018/0214927 | A1* | 8/2018 | Sohmshetty | B21D 22/02 |
| 2018/0304341 | A1* | 10/2018 | Frost | B21C 23/142 |

FOREIGN PATENT DOCUMENTS

| | | | | |
|---|---|---|---|---|
| DE | 102014104222 A1 * | 10/2015 | | B21D 5/083 |
| DE | 102009060694 B4 | 10/2016 | | |
| DE | 102016112481 A1 * | 1/2018 | | B21D 22/26 |
| EP | 2923865 B1 * | 5/2019 | | B60G 21/051 |
| JP | 2004160553 A * | 6/2004 | | B21D 5/083 |

OTHER PUBLICATIONS

EP-2923865-B1 Translation (Year: 2019).*
DE-102016112481-A1 Translation (Year: 2018).*
JP2004160553A Translation (Year: 2004).*
DE102014104222A1 machine translation (Year: 2014).*

* cited by examiner

A-A:
B-B:

C-C:

METHOD FOR PRODUCING A CROSSMEMBER FOR A VEHICLE AND A CROSSMEMBER FOR A VEHICLE

CROSS-REFERENCE TO PRIORITY APPLICATION

This application claims the benefit of, and priority to, German patent application number DE 102018115740.1, filed Jun. 29, 2018. The content of the referenced application is incorporated by reference herein.

TECHNICAL FIELD

Embodiments of the subject matter described herein relate generally to a method for producing a crossmember for a vehicle, in particular a crossmember for a floor structure, and to a crossmember for a vehicle.

BACKGROUND

Larger means of transport can have a floor structure which is arranged on crossmembers connected to a primary structure. In passenger aircraft, such crossmembers can be composed of metallic materials, for instance, which are produced by means of strip-type material that is unwound from a kind of coil and rolled over rollers. The strip-type material is thereby formed in such a way that a desired profile is obtained. Recesses and holes to reduce the weight of the crossmember are produced by punching and deep drawing, laser cutting or other methods.

Patent document DE 10 2005 060 252 A1, for instance, shows a method for producing a crossmember or a structural component of a vehicle in which a profiling station having rollers or rolls is employed.

Patent document DE 10 2009 060 694 B4 discloses a crossmember for a floor structure of an aircraft having a web, which can be attached to opposite structural sections of an aircraft fuselage by means of its opposite end sections, wherein the web has at least one stepped section, which is formed by an offset in the web in the direction of the vertical axis thereof, wherein the stepped section has a narrower cross section relative to adjacent web sections, and the web sections each have a lower flange section set back relative to the end sections. It is thereby possible, in particular, to lay system lines in an advantageous manner below the crossmember.

BRIEF SUMMARY

While it is possible to carry out deformation of metal sheets easily with the use of rollers and rolls, the relatively complex shaping of a crossmember for aircraft requires a similarly complex production method. In addition to pure deformation, this can also include machining steps.

It is an object of the disclosure to propose a method for producing a crossmember in which as simple as possible production is made possible and, in particular, it is possible to dispense with method steps involving machining.

The object is achieved by a method having the features of independent claim 1. Advantageous developments and embodiments can be found in the dependent claims and the following description.

A method for producing a crossmember for a vehicle is proposed, the method having the steps of preparing a workpiece having different thicknesses and a preliminary contour from a metal sheet of uniform thickness by flat roll forming to achieve different local thicknesses and cutting out the workpiece, and bending roll forming the workpiece to form a crossmember with a cross section which has at least two flanges arranged opposite one another and a web situated between said flanges, wherein the distance between the flanges arranged opposite one another is not constant along a longitudinal extent of the crossmember, and a thickness profile at least of the web is determined by the step of flat roll forming, and wherein the local thicknesses and the preliminary contour are chosen so that a geometrical shape of the crossmember after the bending roll forming corresponds to a predetermined geometrical shape with different thicknesses and heights of the web and differently shaped regions of the flanges along the longitudinal extent of the crossmember.

Consequently, the method according to the disclosure has three essential main steps to produce the crossmember if a metal sheet having a uniform thickness is available as a starting point.

By means of the step of flat roll forming, different local thicknesses of the workpiece, which subsequently determine the thickness of the web and/or of the flanges, are achieved. During this process, regions with a maximum material thickness and a plurality of second regions with a minimum material thickness can be produced, wherein further regions with intermediate thicknesses or transitions from adjoining thicknesses are possible. Consequently, the preliminary contour can be regarded as a geometrical development of the crossmember. Cutting out the flat material is an equally significant step for the preparation of the crossmember.

The flat roll forming and the cutting out can be carried out in different sequences. In the case of a metal sheet with a very uniform thickness, it would be possible, in one variant, first of all to cut out a workpiece with a temporary preliminary contour and then to modify the thickness of said workpiece by flat roll forming. This gives rise not only to the desired thickness profile but also to the desired preliminary contour. The determination of the temporary preliminary contour is dependent on the transverse contraction of the metal sheet during the subsequent flat roll forming. For this purpose, the temporary preliminary contour could be determined in an iterative process, for instance, in order to ensure repeatable precision in the subsequent preliminary contour.

However, it is also possible first of all to carry out thickness modification of the metal sheet by flat roll forming, giving a desired thickness profile. The workpiece can then be cut out of the modified metal sheet directly with the appropriate preliminary contour.

The cut out workpiece consequently has a desired thickness profile and has a suitable preliminary contour for further deformation. This is decisive for the subsequent three-dimensional shape of the crossmember since it is chosen in such a way that precisely the desired shape of the crossmember is formed after the subsequent bending roll forming. This means that all the external contours of the resulting crossmember correspond to the specified external contours and all the thicknesses of the web and of the flanges are achieved by means of the flat roll forming. Consequently, finish-machining of the crossmember after the bending roll forming is not required to obtain the desired external contours and the desired profile of the material thickness of the web and of the flanges.

The bending roll forming, which is carried out in the form of roll profiling for instance, is provided for the purpose of producing a three-dimensional structure in the form of the crossmember from the flat workpiece by bending individual surface areas of the workpiece. For this purpose, it is possible, in particular, to use a profiling system which carries out the bending as roll bending in the form of roll profiling, roll forming or cold rolling. In this process, the workpiece is passed through several pairs of rolls, which are arranged and shaped in such a way that they have a deforming effect on the workpiece. By passing the workpiece through once or repeatedly, the desired profile shape is ultimately achieved. It is conceivable for the individual pairs of rollers of the apparatus employed to be arranged in fixed positions in space, with the result that they form a kind of roll train and the desired shape is achieved after the workpiece has been passed through a single time. As an alternative, the pairs of rolls can also be arranged at different positions and, in particular, can be moved under computer control. Controlled rollers that can be moved in this way are appropriate in the case of step changes in thickness in order to ensure dimensional accuracy of the crossmember to be produced. Thus, it would be possible to enable larger local deviations in the design of the crossmember to be achieved without requiring an extended roll train. However, this would be an alternative option, in which sheet metal was introduced from a coil on one side and finished crossmembers joined together were discharged on another side and then had only to be separated.

Consequently, the method according to the disclosure results in a crossmember which is suitable, for instance, for supporting a floor structure in an aircraft. This means that the crossmember can be attached by two mutually opposite ends to a primary structure of an aircraft and extends transversely to the longitudinal axis of the aircraft fuselage. Consequently, the at least two flanges arranged opposite one another can be positioned on an upper side and a lower side of the crossmember, wherein one of the flanges, which is arranged on the upper side, can support floor rails or similar of a floor structure.

In particular, the vehicle can be an aircraft, and therefore the method can also be, in particular, a method for producing a crossmember for an aircraft.

In an advantageous embodiment, the bending roll forming is carried out in such a way that, in at least one first section, the distance between the flanges arranged opposite one another falls below the distance in the remaining part of the crossmember. Such variation of the resulting web height can lead to adaptation of a second moment of area of the crossmember in a manner which is appropriate to the loading if the first section is provided where there is lower mechanical loading during the operation of the aircraft. It can be assumed that the highest mechanical loads may be expected in a central region of the crossmember, for example, and therefore the highest second moment of area should be at that location, for example. In other regions of the crossmember, it would be possible to implement different configurations of the profile of the crossmember which are matched to a somewhat lower mechanical loading and furthermore allow lines to be passed through on the lower side of the crossmember.

In a preferred embodiment, during the bending roll forming, at least one first flange and at least one second flange are produced, wherein the first flange has a continuously flat supporting surface along the longitudinal extent of the crossmember and wherein the second flange is spaced apart by different amounts from the first flange along the longitudinal extent of the crossmember. Consequently, the at least one first flange is provided for the purpose of being positioned on an upper side of the crossmember when the latter is attached to the primary structure of the aircraft fuselage. Accordingly, the second flange is situated on the lower side of the crossmember and is spaced apart by different amounts from the first flange in the vertical direction. To take account of a mechanical loading which can be less in certain regions than in other, adjacent regions, part of the second flange can be at a shorter distance from the first flange than in other, adjacent parts, for instance. The offset or concave arch of the second flange on the lower side can consequently provide a receiving space for the passage of electric lines and other lines.

In an advantageous embodiment, the preliminary contour is chosen in such a way that there is a concave arch in the direction of the first flange in at least one section of the crossmember. This concave arch can be used to install lines that run past the crossmember. The concave arch can preferably be configured in such a way that any lines provided can be installed in a manner largely flush with adjacent regions of the second flange. It is furthermore worthwhile to provide the concave arch with a smooth, continuous curvature formed without any abrupt changes. It is thereby possible to avoid notch effects and stress peaks.

In an equally preferred embodiment, two first sections are provided, which are arranged spaced apart off-center on the crossmember. The two first sections could be arranged in two different halves of the crossmember, with the result that both sides of the crossmember are designed for the passage of lines, in particular on a lower side.

In a particularly preferred embodiment, the flat roll forming is carried out in such a way that the sheet-metal thickness is greatest in a central region of the crossmember. As a result of this, the thickness of the web of the crossmember is greatest in the center of the crossmember in this embodiment. This could also apply to the thickness of the flanges, which could consequently be greatest in the central region. Overall, this provides a maximum second moment of area, which leads to a particularly high mechanical stability in the region of the center of the crossmember.

In another advantageous embodiment, the flat roll forming is carried out in such a way that the sheet-metal thickness is less in the region of the first section than in adjacent sections. Consequently, this leads to a smaller web thickness and, if desired, to a smaller flange thickness in the first section, in which a concave arch for the passage of lines could be present. The second moment of area in this region is thereby lowered.

The flat roll forming is preferably carried out in such a way that a transitional region is arranged between two sections of different sheet-metal thickness, in which region the thickness decreases continuously and which continuously adjoins the two adjacent regions. Such a transitional region prevents the formation of a step change in the thickness of the metal sheet and consequently irregular stability. Consequently, it is possible to prevent notch stresses and the like.

The disclosure furthermore relates to a crossmember for a vehicle, having at least two flanges arranged opposite one another and a web situated between said flanges, wherein the distance between the flanges arranged opposite one another is not constant along the longitudinal extent of the crossmember and the thickness at least of the web is not constant along the longitudinal extent of the crossmember and wherein the crossmember is produced by a forming method without machining. In particular, this forming method without machining is the above-described method for producing a crossmember for a vehicle, as indicated in claim 1.

By virtue of the non-machining production process, a significant amount of time can be saved in the production of the crossmember and, at the same time, the selected mechanical properties of the crossmember can be very uniform and harmonious by virtue of the shaping based on a metal sheet.

In an advantageous embodiment, in at least one first section, the distance between the flanges arranged opposite one another falls below the distance in the remaining part of the crossmember.

The first flange preferably has a continuously flat supporting surface along the longitudinal extent of the crossmember, wherein the second flange is spaced apart by different amounts from the first flange along the longitudinal extent of the crossmember.

In another advantageous embodiment, there can be a concave arch of the second flange in the direction of the first flange in at least one section of the crossmember.

Furthermore, the disclosure relates to a vehicle having a vehicle structure and at least one crossmember having the features of the above description, which is secured on the vehicle structure. In particular, the vehicle is an aircraft. The vehicle can preferably have a fuselage having a fuselage structure as a vehicle structure, wherein a plurality of crossmembers is arranged on the fuselage structure transversely to a longitudinal axis of the fuselage.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses of the present disclosure will be found in the following description of the embodiment examples and the figures. Here, all the features described and/or depicted, in themselves and in any desired combination, form the subject matter of the disclosure, even when considered independently of their combination in the individual claims or the dependency references thereof. In the figures, the same reference signs furthermore stand for identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
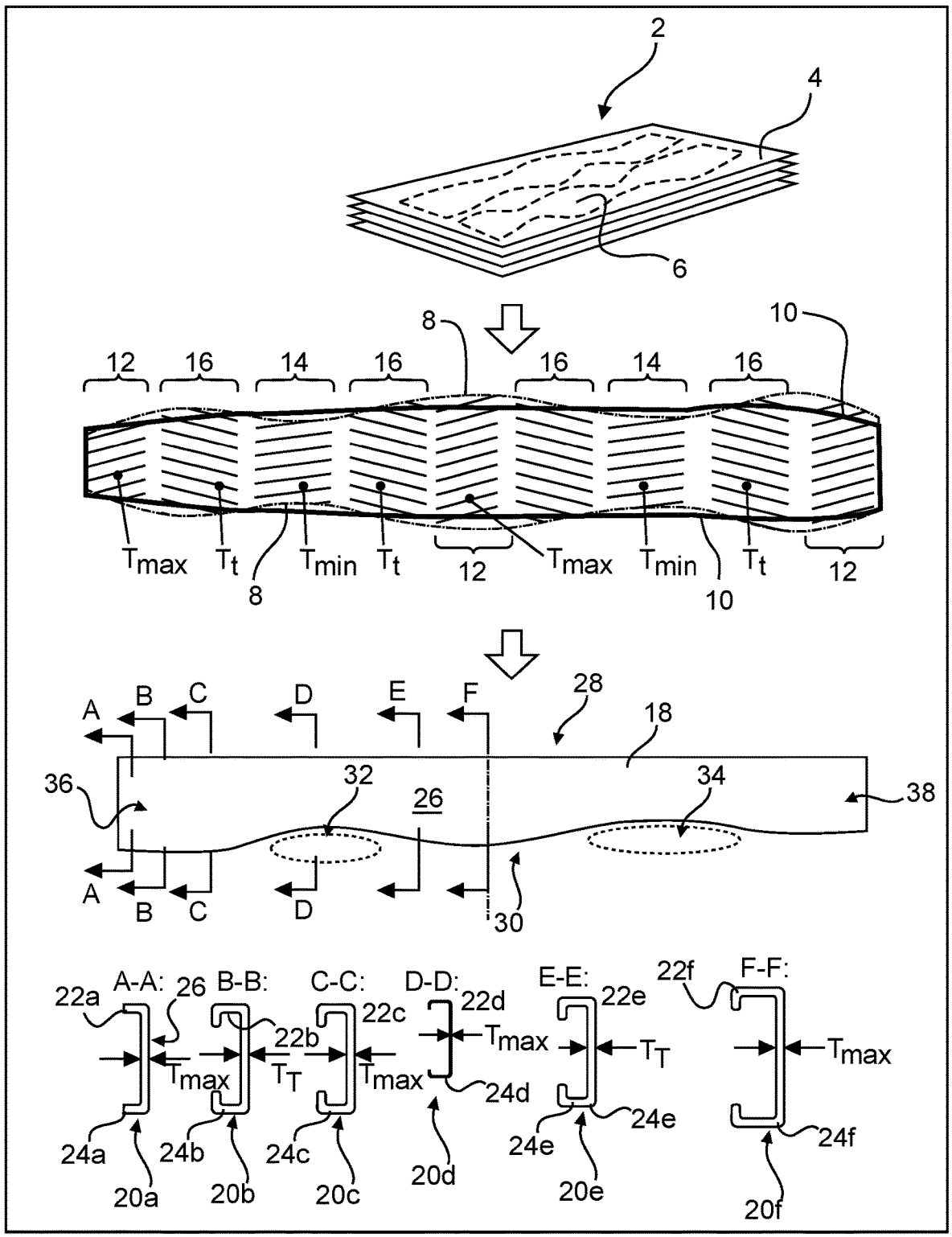
FIG. 1 shows a schematic illustration of the individual steps of the method.

FIG. 1 shows a sequence of the method 2 according to the disclosure in a schematic illustration. First of all, a metal sheet 4 with a uniform thickness is supplied.

The metal sheet 4 is then modified by flat roll forming in such a way that local thicknesses are changed.

By way of example, three first regions 12, which have a maximum thickness (Tmax), are produced on the metal sheet 4. Two second regions 14 are provided, which are arranged between the first regions 12 and here have a minimum material thickness (Tmin), by way of example. In addition, third regions 16 in the form of transitional regions with a thickness Tt, in which a continuous transition from the thickness Tmax to Tmin takes place, are provided between all the first regions 12 and second regions 14. Consequently, the workpiece 6 is adapted to provide the crossmember to be produced with wall thicknesses appropriate to the loading.

A flat workpiece 6 having a preliminary contour 10 is cut out from the metal sheet modified in this way. Here, the preliminary contour 10 is the outer contour which determines the shape of the workpiece 6.

As an alternative, it would also be possible for the workpiece 6 to be cut out of the metal sheet 4 before the flat roll forming process. The workpiece 6 would then initially have a temporary preliminary contour 8. After the flat roll forming process, the transverse contraction of the workpiece 6 results in the desired preliminary contour 10, which is the basis for the next step.

The workpiece 6 is then shaped into a crossmember 18 by a bending roll forming process. This is carried out, in particular, by successive bending of the workpiece 6 at the edges to obtain the desired shape. The crossmember 18 has a number of different cross sections 20a to 20f, which each have two flanges 22a and 24a to 22f and 24f arranged opposite one another. The two flanges 22a to 22f and 24a to 24f enclose a web 26, which does not have a constant height along the longitudinal extent of the crossmember 18. Cross section 20a is arranged close to a first end 36 of the crossmember 18, while cross section 20f is positioned close to a center of the crossmember 18. Cross sections 20a to 20f thus represent virtually half of the crossmember 18. The other half can be configured in the same way.

The resulting crossmember 18 has a flat supporting surface 28, which, when the crossmember 18 is installed in an aircraft fuselage, is set up to receive a floor structure. This can be in the form of floor rails or other supports, for instance, between which floor panels are arranged.

By way of example, a lower side 30 on which the second flanges 24a to 24f are arranged has two concave arches 32 and 34, in which the height of the web 26 is particularly small. These concave arches 32 and 34 can be used to pass through lines on a lower side of the crossmember 18. Two mutually opposite ends 36 and 38 of the crossmember are furthermore provided for the purpose of securing the crossmember 18 on a primary structure of the aircraft fuselage. This could be accomplished by means of riveted or bolted joints, for example.

Figure 2:
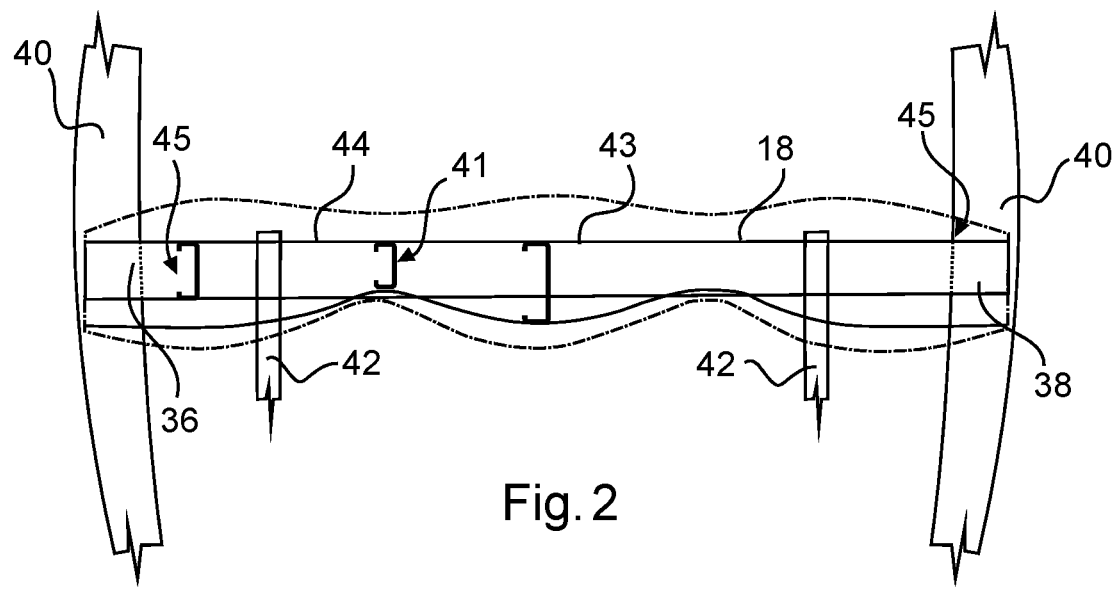
FIG. 2 shows a partially sectioned illustration of a crossmember, which is connected to a frame.

FIG. 2 shows the installed crossmember 18, which extends between two mutually opposite fixing regions of a frame 40 as a vehicle structure or fuselage structure. As indicated schematically, the profile cross section of the crossmember 18 is configured in a manner appropriate to the loading. Whereas a conventional crossmember, which has a contour 44 for example, has a continuous constant web height, the crossmember 18 according to the disclosure has a greater web height at points of higher loading than in regions of lower loading. At least two first sections 41 are provided, in which the profile cross section of the crossmember 18 has a second moment of area which is significantly less than the average second moment of area. By way of example, a minimum web height and a minimum possible profile cross section are present here. In a second section 43, the second moment of area is at a maximum and a maximum web height with a maximum profile cross section is present. Towards the ends 36 and 38 there are two third sections 45, which have an intermediate web height and intermediate profile cross sections in terms of size.

Figure 3:
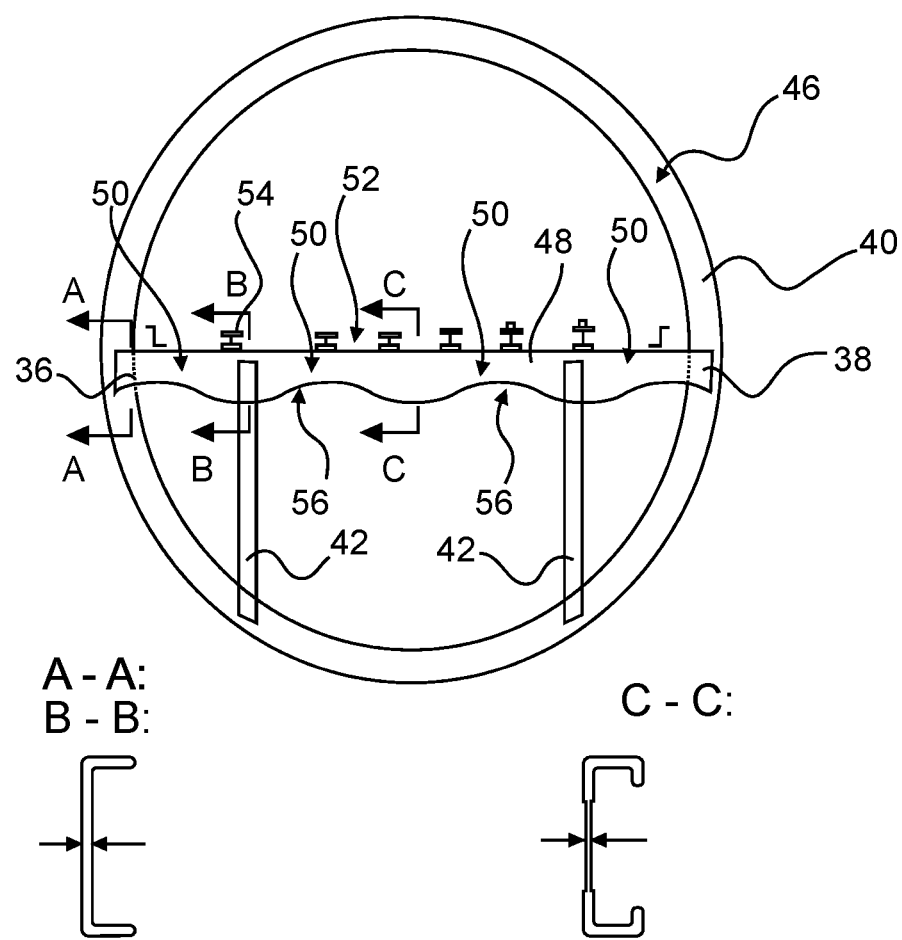
FIG. 3 shows a variant having four concave arches on a lower side of the crossmember.
Figure 3:
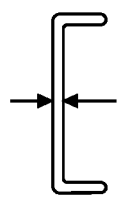
Figure 3:
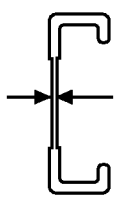

FIG. 3 furthermore shows an overall view of a fuselage cross section 46 with a crossmember 48 arranged therein, which is secured by mutually opposite ends 36 and 38 on the frame 40 and rests on the bearing rods 42. In addition to different thicknesses, it is also possible to generate different local profile cross sections, which are also reflected in different flange geometries and different flange thicknesses. In this case, by way of example, four first sections 50 are provided, which have a minimum profile cross section. In combination with a straight upper side 52, on which floor supports 54 are arranged, four concave arches 56 are thereby formed on a lower side. These lead to a capacity to pass lines along the lower side of the crossmember 48. Possible profile cross sections, which can have different local thicknesses and shapes, are shown in two sectional illustrations A-A, B-B and C-C. The profile cross section in illustration C-C is associated, for instance, with the center of the crossmember 48 and contains a C-shaped contour with a locally small thickness of the web and flange end edges which run parallel to the web. The profile cross sections which are associated with A-A and B-B are arranged approximately at the ends 36 and in a fastening region with bearing rods 42.

Figure 4:
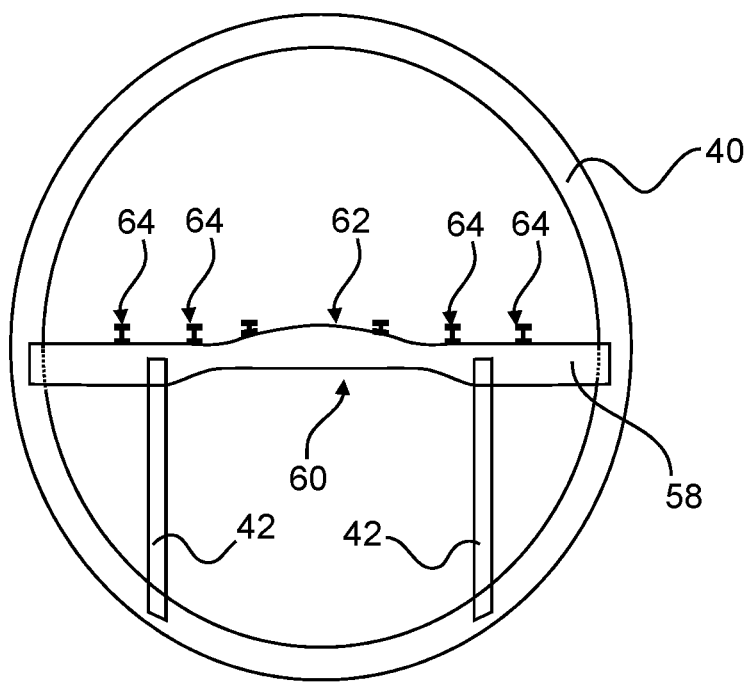
FIG. 4 shows a variant having one concave arch on a lower side and one convex arch on an upper side of the crossmember.

FIG. 4 shows another variant of a crossmember 58, which has a larger central concave arch 60, which is reflected, in turn in a central convex arch 62 on the upper side. Floor supports 64, which extend parallel to one another and at a distance from one another, are furthermore arranged there. The installation heights of the floor supports 64 are matched to the central convex arch 62. Overall, these can define the same upper boundary.

Figure 5:
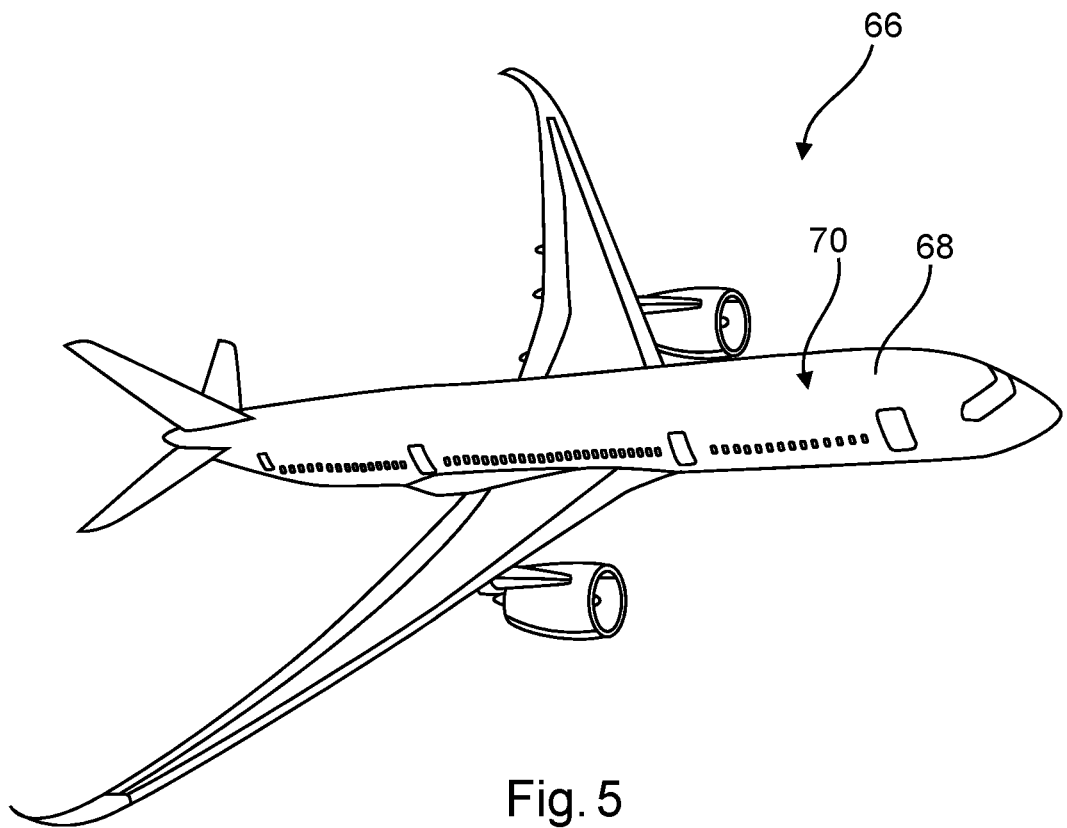
FIG. 5 shows an aircraft with a fuselage and crossmembers arranged therein.

Finally, FIG. 5 shows an aircraft 66, which has a fuselage 68 with an interior space 70 formed therein, in which at least one crossmember 18, 48 or 58 of this kind is arranged.

For the sake of completeness, it should be noted that "having" does not exclude any other elements or steps and "a" or "an" does not exclude a multiplicity. It should furthermore be noted that features which have been described with reference to one of the above embodiment examples can also be used in combination with other features of other embodiment examples described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for producing a crossmember for a vehicle, comprising the steps of: preparing a workpiece having different thicknesses and a preliminary contour from a metal sheet of uniform thickness by flat roll forming to achieve different local thicknesses and cutting out the workpiece; bending roll forming the workpiece to form a crossmember with a cross section which has at least two flanges arranged opposite one another and a web situated between said flanges, wherein the distance between the flanges arranged opposite one another is not constant along a longitudinal extent of the crossmember, and a thickness profile at least of the web is determined by the step of flat roll forming, wherein said at least two flanges each lie in a plane that is not parallel with a plane containing the web, and wherein said at least two flanges each extend away from the web in the same direction wherein the local thicknesses and the preliminary contour are such that that a geometrical shape of the crossmember after the bending roll forming corresponds to a predetermined geometrical shape with different thicknesses and heights of the web and differently shaped regions of the flanges along the longitudinal extent of the crossmember a middle region of the crossmember comprises a C-shaped profile and respective ends of the crossmember comprise a U-shaped profile, and, installing the crossmember in an aircraft, wherein the crossmember forms a supporting structure for a floor of the aircraft.

2. The method according to claim 1, wherein the flat roll forming is carried out such that the thickness of the workpiece is greatest in a central region of the crossmember.

3. The method according to claim 1, wherein the flat roll forming is carried out such that a transitional region is arranged between two regions of different sheet-metal thickness, in which region the thickness decreases continuously and which continuously adjoins the two adjacent regions.

4. The method according to claim 1, wherein two first sections are provided, which are arranged spaced apart off-center on the crossmember.

5. The method according to claim 4, wherein the flat roll forming is carried out such that the sheet-metal thickness is less in the region of the two first sections than in adjacent regions.

6. The method according to claim 1, wherein the bending roll forming is carried out in such a way that, in at least one first section, the distance between the flanges arranged opposite one another falls below the distance in the remaining part of the crossmember.

7. The method according to claim 6, wherein the flat roll forming is carried out such that the sheet-metal thickness is less in the region of the at least one first section than in adjacent regions.

8. The method according to claim 6, wherein:
   during the bending roll forming, at least one first flange and at least one second flange are produced;
   the at least one first flange has a continuously flat supporting surface along the longitudinal extent of the crossmember; and
   the at least one second flange is spaced apart by different amounts from the at least one first flange along the longitudinal extent of the crossmember.

9. The method according to claim 8, wherein the preliminary contour is configured to provide a concave arch of the at least one second flange in the direction of the at least one first flange in at least one section of the crossmember.

* * * * *